United States Patent
Deau et al.

(10) Patent No.: US 9,676,158 B2
(45) Date of Patent: Jun. 13, 2017

(54) METHOD FOR MANUFACTURING A CONTAINER FROM A PREFORM, WITH FEEDBACK DEPENDING ON A MINIMUM PRESSURE DETECTED

(75) Inventors: Thierry Deau, Octeville sur Mer (FR); Julien Gendre, Octeville sur Mer (FR); Isabelle Maillot, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 354 days.

(21) Appl. No.: 13/816,369

(22) PCT Filed: Sep. 14, 2011

(86) PCT No.: PCT/FR2011/052107
§ 371 (c)(1),
(2), (4) Date: Apr. 10, 2013

(87) PCT Pub. No.: WO2012/035260
PCT Pub. Date: Mar. 22, 2012

(65) Prior Publication Data
US 2013/0187304 A1    Jul. 25, 2013

(30) Foreign Application Priority Data
Sep. 16, 2010 (FR) .................... 10 03690

(51) Int. Cl.
*B29D 22/00* (2006.01)
*B29C 49/12* (2006.01)
(Continued)

(52) U.S. Cl.
CPC ............ *B29D 22/003* (2013.01); *B29C 49/12* (2013.01); *B29C 49/783* (2013.01); *B29C 49/06* (2013.01);
(Continued)

(58) Field of Classification Search
None
See application file for complete search history.

(56) References Cited

U.S. PATENT DOCUMENTS

| 4,042,657 A | 8/1977 | Ostapchenko et al. |
| 2008/0319571 A1* | 12/2008 | Voth et al. .................... 700/197 |
| 2010/0176528 A1 | 7/2010 | Monin et al. |

FOREIGN PATENT DOCUMENTS

FR    2 909 304 A1    6/2008

* cited by examiner

*Primary Examiner* — Monica Huson
(74) *Attorney, Agent, or Firm* — Sughrue Mion, PLLC

(57) ABSTRACT

Method of manufacturing a container (2) by stretch-blow molding in a mold (8) from a blank (3) of plastic material, which comprises the operations consisting of:
  measuring the pressure prevailing inside the blank (3) during a pre-blowing phase;
  detecting an instant corresponding to a local minimum pressure in the blank (3);
  placing in memory the instant at which said minimum pressure occurs as well as the corresponding pressure prevailing in the blank (3);
  comparing the instant and the pressure of the detected minimum with, respectively, a predetermined instant and pressure of a theoretical minimum pressure;
  if the measured minimum and the theoretical minimum do not coincide, ordering a modification of at least one of the following parameters: pre-blowing pressure, pre-blowing flow rate, stretching speed, heating temperature.

15 Claims, 3 Drawing Sheets

(51) Int. Cl.
  *B29C 49/78* (2006.01)
  *B29C 49/06* (2006.01)
  *B29C 49/42* (2006.01)
  *B29K 67/00* (2006.01)

(52) U.S. Cl.
  CPC  *B29C 49/4289* (2013.01); *B29C 2949/78025* (2013.01); *B29C 2949/78294* (2013.01); *B29C 2949/78352* (2013.01); *B29C 2949/78378* (2013.01); *B29C 2949/78537* (2013.01); *B29C 2949/78571* (2013.01); *B29C 2949/78621* (2013.01); *B29C 2949/78663* (2013.01); *B29C 2949/78806* (2013.01); *B29C 2949/78882* (2013.01); *B29K 2067/003* (2013.01)

METHOD FOR MANUFACTURING A CONTAINER FROM A PREFORM, WITH FEEDBACK DEPENDING ON A MINIMUM PRESSURE DETECTED

CROSS REFERENCE TO RELATED APPLICATIONS

This application is a National Stage of International Application No. PCT/FR2011/052107 filed Sep. 14, 2011, claiming priority based on French Patent Application No. 10 03690 filed Sep. 16, 2010, the contents of all of which are incorporated herein by reference in their entirety.

The invention concerns the manufacture of containers, by blow molding or stretch-blow molding from plastic blanks.

To manufacture a container, a single blow-molding step can be used, or several blow-molding steps. In the first case, the method begins with a preform obtained by injection, which is first heated to a temperature higher than the glass transition temperature of the material. The heated preform is then inserted into a mold, prior to injecting a fluid into it (particularly such as air) under pressure to directly obtain the final container. In the second case, starting with the preform, a first blow molding is performed, which leads to an intermediate container, which is itself reheated and blow molded again to obtain the final container.

"Blank" is understood as designating the injected preforms as well as the intermediate containers obtained upon completion of a first blow-molding operation of a preform, and intended to undergo at least a second blow molding.

The stretch-blow molding technique, in addition to the blow molding of the blank (preform or intermediate container), consists of stretching it by means of a slide rod, particularly in order to minimize the misalignment of the container and to make the distribution of the material as uniform as possible.

The blow molding itself comprises several successive operations of injecting a gas into the blank. A first operation, called pre-blowing, consists of injecting a gas under low pressure (called pre-blowing, generally between 5 and 16 bars) into the blank. A second operation, called blow molding per se, consists of injecting a gas under high pressure (called blow molding, generally more than 25 bars, and commonly between 30 and 35 bars) into the blank. The stretching of the blank takes place during the pre-blowing operation, blow molding not taking place until thereafter.

In an industrial production context, manufacturing rates reached several tens of thousands of containers per hour and per machine, which ordinarily comprises a series of molds mounted on the periphery of a turning carousel. The cycle time between the instant when the blank is inserted into the mold and the instant when the formed container is ejected from the mold is several seconds. The pre-blowing operation itself only lasts several tenths of a second.

A poor distribution of the material is a recurring defect noted in the containers. It is not necessarily a question of ensuring that the wall thickness of the container is constant, because in some cases, it may be desirable to thicken certain areas, especially those areas intended to undergo significant stresses (particularly near the bottom). Rather, it is a question of ensuring that the material thickness corresponds to the specifications for the container, as defined in accordance with its form and use.

While it is known that the adjustment, even fine, of the heating parameters (particularly the heating temperature) and blowing parameters (particularly blowing pressure) has a determinant influence on the final form of the container, the cause-and-effect relationship between a modification of these parameters and the distribution of the material in the container is poorly known.

In general, machine adjustments are entrusted to qualified operators who, as a result of their know-how, deduce the adjustments to be made from the visual and tactile inspections they perform on sample containers upon completion of the blow molding. The problem with this approach is that it cannot be automated, each operator having his own skill level. Furthermore, because of the high production rates, the inspections can only be occasional, and a qualitative deviation found during an inspection places in doubt the quality of all of the containers produced since the previous inspection.

Some manufacturers, such as DuPont De Nemours in its U.S. Pat. No. 4,042,657, have a more systematic approach, recommending the elimination of containers for which the pressure curve does not conform to a standard curve. However, the result is a high rejection rate, with no notable progress towards a better control of the quality of the containers produced.

More recently, it has been proposed (see the published international application WO 2008/081107 and the American patent application US 2010/176528, which stems from it) to carry out an occasional correlation between the singular points of an actual blowing curve and the corresponding points of a theoretical blowing curve, and to modify machine parameters based on divergences found at the singular points. This solution, in the process of implementation, seeks to enable at least a partial automation of the machine adjustments.

In practice, the implementation is difficult because of the multiplicity of parameters and their correlation. Thus, it is found that a modification made to at least one of the parameters (pressure, temperature), intended to correct the position of a given point on the pressure curve, has uncontrolled repercussions on the curve as a whole.

The invention seeks to improve the existing methods of manufacturing containers, and more specifically to facilitate true automation of production.

To that end, the invention first proposes a method of manufacturing a container by stretch-blow molding a blank of plastic material in a mold, which comprises the operations consisting of:

heating the blank to a predetermined heating temperature;
inserting the blank into the mold;
stretching the blank by means of a rod moved at a predetermined stretching speed;
at a predetermined instant, called pre-blowing cue, ordering the opening of a solenoid valve to place the interior of the blank in communication with a source of gas at a predetermined pre-blowing pressure and pre-blowing flow rate;
measuring the pressure prevailing inside the blank;
detecting an instant corresponding to a local minimum pressure in the blank;
storing in memory the instant at which said minimum pressure occurs as well as the corresponding pressure prevailing in the blank;
comparing the instant and the pressure of the detected minimum with, respectively, a predetermined instant and pressure of a theoretical minimum pressure;
if the measured minimum and the theoretical minimum do not coincide, ordering a modification of at least one of the following parameters: pre-blowing pressure, pre-blowing flow rate, stretching speed, heating temperature.

Very many tests were required before the hypothesis could be formulated according to which the position of a local minimum on the pressure curve could have a determinant influence on the final quality of the containers, such that there was a strong conviction that concentration should rather be made on the pressure peaks. In fact, the tests showed that the corrections made to the machine parameters based on the position of a local minimum pressure during pre-blowing make it possible to significantly improve the quality of the containers.

More specifically, the method comprises:
if the instant and the pressure of the detected minimum are, respectively, prior to and lower than the instant and the pressure of the theoretical minimum, an operation consisting of lowering the heating temperature or the stretching speed;
if the instant and the pressure of the detected minimum are, respectively, prior to and equal to the instant and the pressure of the theoretical minimum, an operation consisting of decreasing the pre-blowing pressure or the flow rate, and possibly an additional operation consisting of lowering the heating temperature or the stretching speed;
if the instant and the pressure of the detected minimum are, respectively, prior to and higher than the instant and the pressure of the theoretical minimum, an operation consisting of decreasing the pre-blowing pressure or the flow rate;
if the instant and the pressure of the detected minimum are, respectively, equal to and higher than the instant and the pressure of the theoretical minimum, an operation consisting of decreasing the pre-blowing pressure or the flow rate, and possibly an additional operation consisting of increasing the heating temperature or the stretching speed;
if the instant and the pressure of the detected minimum are, respectively, later and higher than the instant and the pressure of the theoretical minimum, an operation consisting of increasing the heating temperature or the stretching speed.
if the instant and the pressure of the detected minimum are, respectively, later than and equal to the instant and the pressure of the theoretical minimum, an operation consisting of increasing the pre-blowing pressure or the flow rate, and possibly an additional operation consisting of increasing the heating temperature or the stretching speed.
if the instant and the pressure of the detected minimum are, respectively, later and lower than the instant and the pressure of the theoretical minimum, an operation consisting of increasing the pre-blowing pressure or the flow rate.
if the instant and the pressure of the detected minimum are, respectively, equal to and lower than the instant and the pressure of the theoretical minimum, an operation consisting of increasing the pre-blowing pressure or the flow rate, and possibly an additional operation consisting of lowering the heating temperature or the stretching speed.

Secondly, the invention proposes a computer program intended to be implemented on a control unit of a machine for manufacturing containers from blanks of plastic material, which comprises instructions for the implementation of the operations of the method described above.

Other objects and advantages of the invention will be seen from the following description, provided with reference to the appended drawings in which.

Figure 1:
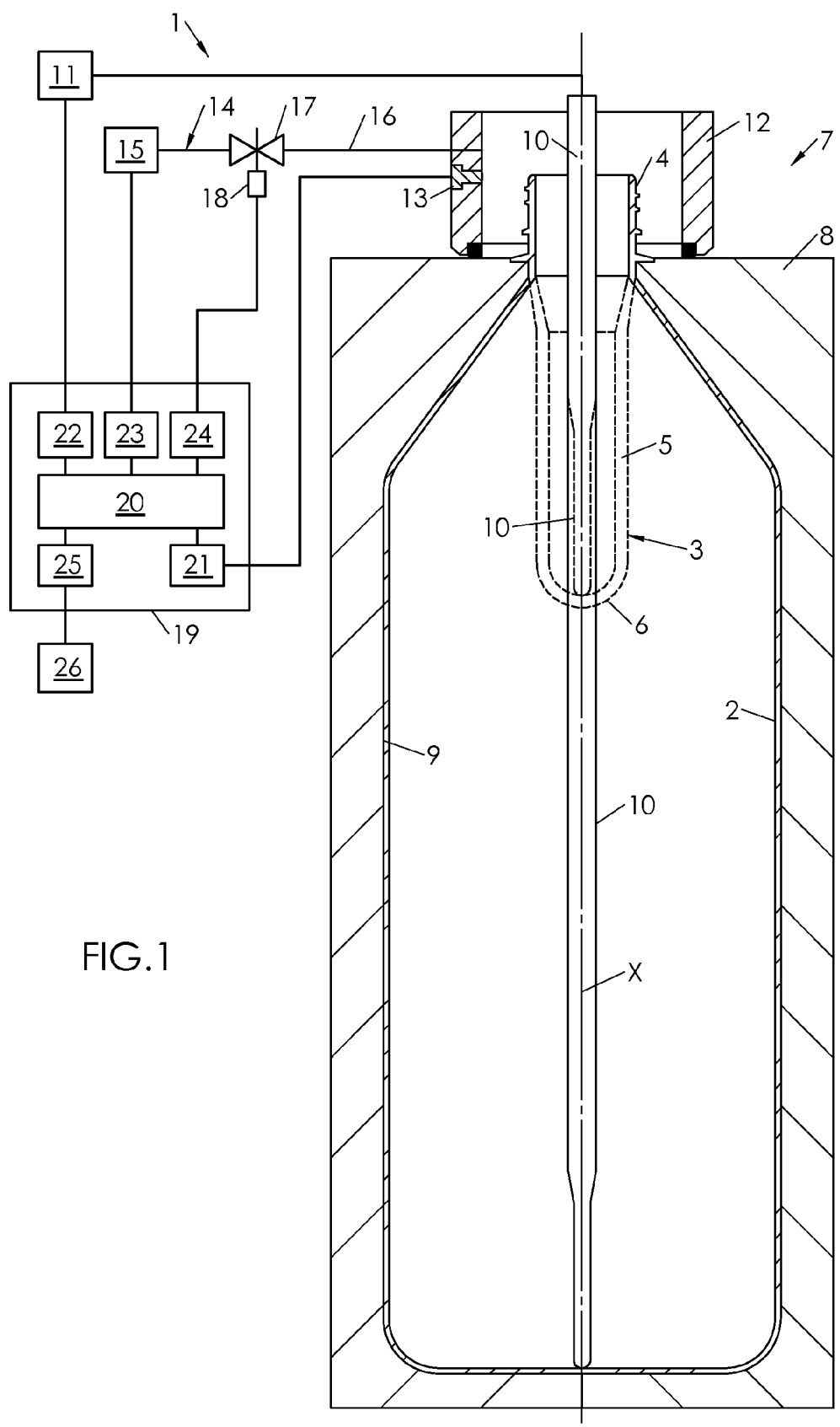
FIG. 1 is a diagrammatic view illustrating a machine for manufacturing containers, and showing more specifically, in cross-section, a mold in which a container (solid line) is blown from a preform (dotted line)

Partially illustrated in FIG. 1 is a machine 1 for manufacturing containers 2 from blanks 3 of plastic material such as PET (polyethylene terephthalate). According to a preferred embodiment, the blanks 3 are preforms from which the final containers 2 are directly obtained, without going through an intermediate container. Each preform 3 comprises a neck 4 (which does not undergo deformation during the formation of the container 2), and a cylindrical body 5 ending in a hemispherical bottom 6.

The machine 1 is equipped with a plurality of molding units 7 mounted on the periphery of a carousel and each comprising a mold 8 composed of two mold halves that together define an internal cavity 9 of the impression of the container 2.

Each mold 8 is intended to receive a preform 3 from an oven situated upstream from the molding units 7 and where each preform 3 is carried, for example by means of lamps emitting infrared radiation, at a temperature T higher than the glass transition temperature (about 80° C. for PET) before being transferred to a molding unit 7.

Each molding unit 7 further comprises:
a stretch rod 10 slidably mounted with respect to the mold 8 along a principal axis X (generally in revolution),
a device 11, preferably of the electromagnetic type, to control the axial movement of the rod 10 (the notation $V_E$ is used for the speed of movement of the rod 16, said speed $V_E$ also being called the stretching speed),
a nozzle 12 that covers the upper face of the mold 8, while covering the neck 4, which extends beyond the face of the mold,
a pressure sensor 13 mounted on the nozzle 12 to measure the pressure prevailing in the preform 3, at least during the pre-blowing operation.

The machine further comprises:
a pre-blowing circuit 14 comprising a source 15 of pre-blowing fluid (in this instance, air) at medium pressure (between 5 and 16 bars) and a duct 16 (which can be at least partially formed in a sidewall of the nozzle 11) connecting the source 15 to each nozzle 12 with the interposition of a pre-blowing solenoid valve 17 on which is mounted a regulator 18 of the pre-blowing flow rate $D_P$,
an electronic (or computerized) control unit 19, electrically connected to the rod movement control device 11, to the pressure sensor 13, to the pre-blowing pressure source 15 and to the solenoid valve 17 via its flow rate regulator 18.

More specifically, the control unit 19 comprises:
a processor 20,
a buffer memory 21, connected to the processor 20, in which the pressure measurements made by the sensor 13 are recorded, four handlers 22, 23, 24, 25, which can be in the form of software modules controlled by (or programmed on) the processor 20, and controlling respectively the device 11 for controlling the axial movement of the rod 10, the source 15 for modulating the pre-blowing pressure supplied to the nozzle 12, the solenoid valve 17 via its regulator 18, so as to modulate the flow rate $D_P$ of air supplied to the nozzle 12, and a device 26 for regulating the power of the oven lamps, ultimately in order to adjust the heating temperature T of the preforms.

For the practical realization of the nozzle 12 and the integration of the solenoid valve 17, reference can be made to the application FR 2 872 082 (Sidel) or its international equivalent, WO 2006/008380.

Following is a description of the forming of a container 2 from a previously heated preform 3.

The hot preform 3, at a temperature higher than the glass transition temperature of the material (in the case of PET, the preform is heated to a temperature generally between 120° C. and 140° C.), is inserted neck-4 upwards into a previously opened mold 8, the stretch rod 10 being in a retracted position to allow the insertion of the preform 3.

Figure 2:
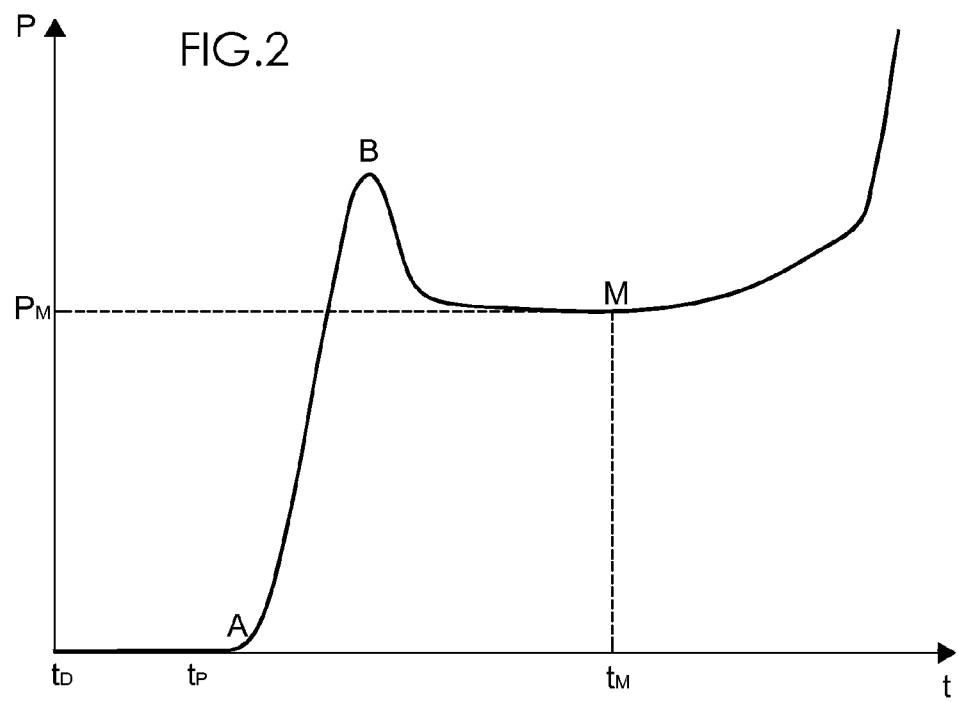
FIG. 2 is a diagram on which a curve is traced illustrating the variations in pressure prevailing in the preform during its pre-blowing.

As the carousel on which the molding unit 7 is mounted rotates, the mold 8 closes over the preform 3 at an instant called start cue $t_D$, which is the origin of the time axis (abscissa) in the diagram of FIG. 2. Starting at that instant, the control unit 19 continuously measures the pressure P prevailing in the preform, the measured values being recorded in the memory 21.

The term "continuously" means that the period at which the pressure measurements are made is small compared to the times necessary for the pressure variations in the preform 3.

To that end, it will be helpful to choose a high-performance sensor 13, enabling the pressure measurements to be made in a period less than or equal to 5 ms (millisecond), preferably less than or equal to 2 ms, the ideal being to make the measurements in a period of 1 ms.

At a predetermined instant, called pre-blowing cue $t_P$, the control unit 19 controls the opening of the pre-blowing solenoid valve 17 to place the interior of the preform 3 in communication with the source 15 of pre-blowing air.

In practice, the actual instant at which the pressure P in the preform 3 begins to increase shows a delay with respect to the pre-blowing cue $t_P$, said delay corresponding to the response time of the solenoid valve 17.

The stretching begins as soon as the rod 10 reaches a median position (represented by a dotted line in FIG. 1) in which the rod 10 comes into contact with the bottom 6 of the preform 3.

The notation A indicates the point of the curve at which the pressure begins to increase, which corresponds to the actual instant at which the pre-blowing begins.

The pressure in the preform 3 increases beginning at the point A as it is stretched elastically, the air flow introduced into the preform 3 being greater as the internal volume of the preform 3 increases, until a local peak is reached at a point noted as B, at an instant noted as $t_B$. The local peak B is assigned to a plastic flow threshold of the preform 3.

At the point B, the slope of the blowing curve is zero, said slope reversing from left (where it is positive) to right (where it is negative) from the point B. The corresponding pressure is noted as $P_B$.

After the local peak at the point B, the pressure P undergoes a decrease attributed to the radial expansion of the preform 3, which, its plastic flow threshold exceeded, undergoes a plastic deformation beginning at instant $t_B$.

It can be seen in FIG. 2 that beginning at the point B, the pressure undergoes a first phase of rapid decrease, the slope of the pressure curve being steep, followed by a second phase of slow decrease, the slope of the curve being gentle.

The pressure P then reaches a local minimum at a point noted as M, after which the pressure again increases, first slowly, then more quickly. The instant at which the pressure reaches this local minimum is noted as $t_M$, and $P_M$ is the pressure prevailing in the preform 3 at that instant.

After a time delay during which the pre-blowing solenoid valve 17 is kept open, the blowing is begun by simultaneously controlling the closure of the pre-blowing solenoid valve 17 and the opening of a blowing solenoid valve connected to the nozzle as well as to a source of air at a blowing pressure higher than the pre-blowing pressure, which causes a sharp increase in the pressure in the preform 3. Said increase is illustrated by the sudden inflection of the pressure curve at the far right of FIG. 2.

The blowing operation is of no interest here, which explains why the curve in FIG. 2 is interrupted at the beginning of the blowing operation.

The assumption of the influence of pre-blowing on the quality of the final container has already been formulated. Numerous tests were conducted before it was possible to identify, for a given preform and final container, a pressure curve making it possible to obtain a container having the characteristics (and particularly a distribution of the material) as close as possible to a pre-established set of specifications.

Said pressure curve is stored in memory in the control unit 19. Because of the differences that will always exist between preforms, and random variations in machine parameters (pressure, flow rate, etc.), which can have external causes (such as a variation in hygrometry or ambient temperature), a perfect concordance between the actual pressure curves measured in the preforms 3 in the blowing process and the theoretical pressure curve would not be guaranteed.

However, an occasional coinciding can be considered if at least one singular point having a significant influence on the characteristics of the container is identified.

This demonstration is not without problems, because any modification of a machine parameter, including the preform 3 heating temperature T, the pre-blowing pressure $P_P$, the pre-blowing flow rate $D_P$ and the stretching speed $V_E$, modify the entire pressure curve. In order to isolate the influence of a selected point, tests must be conducted in such a way that other points assumed to be significant remain substantially fixed on the curve, even though the position of the selected point has just been modified by acting on at least one of the machine parameters.

Thus, it has been able to be shown that the influence of the point M on the characteristics of the final container is significant. More specifically, it has been able to be shown that the quality of the containers produced has been able to be improved significantly by ensuring that the point M substantially coincides with the corresponding local minimum $M_{th}$ on a predefined theoretical pressure curve, irrespective of the position of other presumed singular points (particularly the point B).

Thus, hypothetically, there is a theoretical pressure curve (which can be limited to pre-blowing, as illustrated in FIG. 2) for which the characteristics of the container obtained appear to conform to the pre-established set of specifications.

The point $M_{th}$ is then identified on the theoretical curve, defined by its coordinates ($t_{Mth}$, $P_{Mth}$), corresponding to a local minimum pressure during the pre-blowing. The coordinates ($t_{Mth}$, $P_{Mth}$) of the point $M_{th}$ are stored in memory in the control unit 19.

During production, the actual point M is identified by detecting the local minimum pressure to which said point corresponds. The coordinates ($t_M$, $P_M$) of the point M are stored in memory in each cycle by the control unit 19, which systematically compares them with the coordinates ($t_{Mth}$, $P_{Mth}$) of the theoretical point $M_{th}$.

In practice, the control unit verifies whether the actual point M is located within a tolerance zone defined around the theoretical point $M_{th}$. In practice, the control unit compares, on the one hand, the actual instant $t_M$ with the theoretical instant $t_{Mth}$, and on the other hand, the actual pressure $P_M$ with the theoretical pressure $P_{Mth}$ to verify that both are within tolerance, respectively of time and pressure, defined for the point M.

When the actual point M is within said tolerance zone, the points M and $M_{th}$ are said to coincide, and the machine parameters are preserved for the next cycle.

However, when the actual point M is located outside the tolerance zone, the points M and $M_{th}$ are said to be different, the control unit 19 feeds back at least one of the machine parameters in order to make the actual point M converge in the next cycle with the theoretical point $M_{th}$.

We have seen that the parameters include the pre-blowing pressure $P_P$, the pre-blowing flow rate $D_P$, the stretching speed $V_E$ and the preform 3 heating temperature T.

There can be numerous cases in which the actual instant $t_M$ is prior to, coincides with (i.e., within the tolerance zone) or later than the theoretical instant $t_{Mth}$ and the actual pressure $P_M$ is less than, equal to (i.e., within the tolerance zone) or greater than the theoretical pressure $P_{Mth}$.

It has been determined that the influence of the pressure $P_P$ is similar to that of the flow rate $D_P$. The joint influence of these two parameters can therefore be reduced to the influence of their product $P_P \times D_P$: an increase of this product can result in an increase of the pre-blowing pressure $P_P$ at a constant flow rate $D_P$, an increase of the pre-blowing flow rate $D_P$ at a constant pressure $P_P$, or a simultaneous increase of both $D_P$ and $P_P$; on the contrary, a decrease of the product $P_P \times D_P$ can result in a decrease of the pre-blowing pressure $P_P$ at a constant flow rate $D_P$, a decrease of the pre-blowing flow rate $D_P$ at a constant pressure $P_P$, or a simultaneous decrease of the pressure $D_P$ and flow rate $D_P$, with the understanding that increasing one while decreasing the other does not appear to be useful.

Furthermore, it has been found that the machine parameters influence the position of the point M in the following way:

an increase of the pre-blowing pressure $P_P$ or flow rate $D_P$ (which can be expressed by an increase of the product $P_P \times D_P$) results in an offset of the point M upwards and to the left, i.e., a decrease of its instant $t_M$ and an increase of its pressure $P_M$, an increase of the pre-blowing pressure $P_P$ or flow rate $D_P$ (which can be expressed by a decrease of the product $P_P \times D_P$) results in an offset of the point M downwards and to the right, i.e., an increase of its instant $t_M$ and a decrease of its pressure $P_M$, an increase of the heating temperature T or of the stretching speed $V_E$ results in an offset of the point M downwards and to the left, i.e., a decrease of its instant $t_M$ and a decrease of its pressure $P_M$, a decrease of the heating temperature T or of the stretching speed $V_E$ results in an offset of the point M upwards and to the right, i.e., an increase of its instant $t_M$ and an increase of its pressure $P_M$.

Represented in FIGS. 3 to 10 are the different scenarios that can occur, except for an identity of the actual point M and the theoretical point $M_{th}$.

Figure 3:
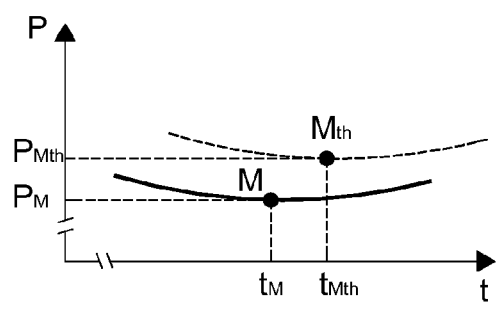
FIGS. 3 to 10 are simplified diagrams on each of which is drawn in a solid line a section of actual pressure curve centered on a local minimum, and in a broken line the corresponding section on a theoretical pressure curve, each figure illustrating a particular case of offset between the minimums, respectively on the actual curve and the theoretical curve.

Represented first in FIG. 3 is a case in which the actual point M is situated below and to the left of the theoretical point $M_{th}$, i.e., $t_M < t_{Mth}$ and $P_M < P_{Mth}$.

In this case, in order to make the actual point M converge towards the theoretical point $M_{th}$, the control unit orders by feedback a decrease of the stretching speed $V_E$ or the heating temperature T.

Figure 4:
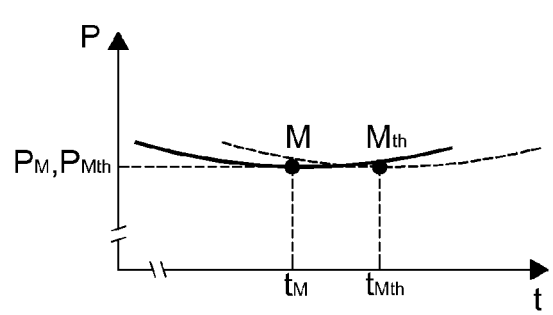

Represented next in FIG. 4 is a case in which the actual point M is situated to the left of the theoretical point $M_{th}$, i.e., $t_M < t_{Mth}$ and $P_M = P_{Mth}$.

In this case, in order to make the actual point M converge towards the theoretical point $M_{th}$, the control unit orders by feedback a decrease in the pre-blowing pressure $P_P$ or flow rate $D_P$ (or of the product $P_P \times D_P$, coupled with (or followed by) a decrease in the stretching speed $V_E$ or the heating temperature T.

Figure 5:
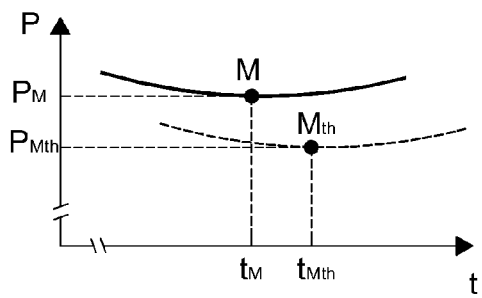

Represented in FIG. 5 is a case in which the actual point M is situated above and to the left of the theoretical point $M_{th}$, i.e., $t_M < t_{Mth}$ and $P_M > P_{Mth}$.

In this case, in order to make the actual point M converge towards the theoretical point $M_{th}$, the control unit orders by feedback a decrease of the pre-blowing pressure $P_P$ or flow rate $D_P$ (or of the product $P_P \times D_P$).

Figure 6:
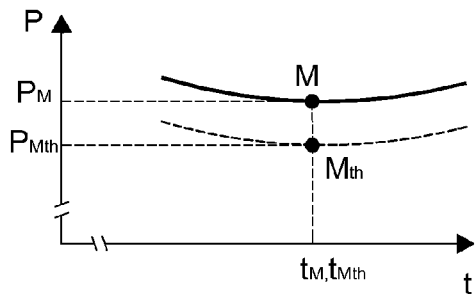

Represented next in FIG. 6 is a case in which the actual point M is situated above the theoretical point $M_{th}$, i.e., $t_M = t_{Mth}$ and $P_M > P_{Mth}$.

In this case, in order to make the actual point M converge towards the theoretical point $M_{th}$, the control unit orders by feedback a decrease of the pre-blowing pressure $P_P$ or flow rate $D_P$ (or of the product $P_P \times D_P$), coupled with (or followed by) an increase of the stretching speed $V_E$ or of the heating temperature T.

Figure 7:
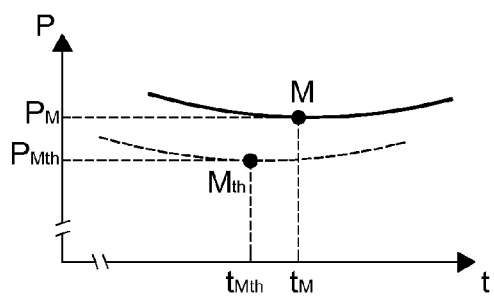

Represented in FIG. 7 is a case in which the actual point M is situated above and to the right of the theoretical point $M_{th}$, i.e., $t_M > t_{Mth}$ and $P_M > P_{Mth}$.

In this case, in order to make the actual point M converge towards the theoretical point $M_{th}$, the control unit orders by feedback an increase of the stretching speed $V_E$ or the heating temperature T.

Figure 8:
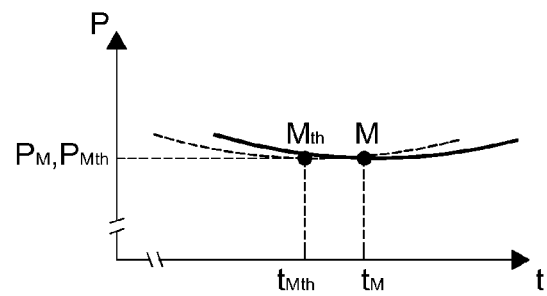

Represented next in FIG. 8 is a case in which the actual point M is situated to the right of the theoretical point $M_{th}$, i.e., $t_M > t_{Mth}$ and $P_M = P_{Mth}$.

In this case, in order to make the actual point M converge towards the theoretical point $M_{th}$, the control unit orders by feedback an increase of the pre-blowing pressure $P_P$ or flow rate $D_P$ (or of the product $P_P \times D_P$), coupled with (or followed by) an increase of the stretching speed $V_E$ or of the heating temperature T.

Figure 9:
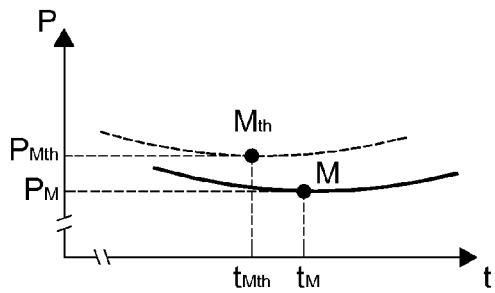

Represented in FIG. 9 is a case in which the actual point M is situated below and to the right of the theoretical point $M_{th}$, i.e., $t_M > t_{Mth}$ and $P_M < P_{Mth}$.

In this case, in order to make the actual point M converge towards the theoretical point $M_{th}$, the control unit orders by feedback an increase of the pre-blowing pressure $P_P$ or flow rate $D_P$ (or of the product $P_P \times D_P$).

Figure 10:
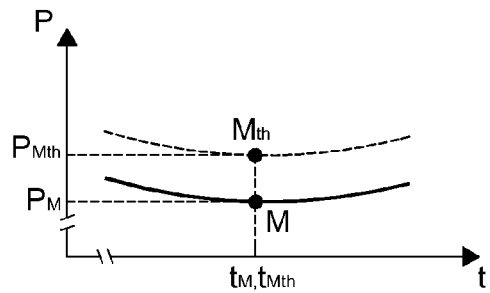

Finally, represented in FIG. 10 is a case in which the actual point M is situated below the theoretical point $M_{th}$, i.e., $t_M = t_{Mth}$ and $P_M < P_{Mth}$.

In this case, in order to make the actual point M converge towards the theoretical point $M_{th}$, the control unit orders by feedback an increase of the pre-blowing pressure $P_P$ or flow rate $D_P$ (or of the product $P_P \times D_P$), coupled with (or followed by) a decrease of the stretching speed $V_E$ or heating temperature T.

A numerical example is provided in the following table, to illustrate the values of the instant and of the pressure of the local minimum M. The measurements shown correspond to the pressure curve of FIG. 2.

| Parameter | Value |
|---|---|
| Type of container | Bottle 1.5 L |
| Material | PET |
| T | 120-140° C. |
| $P_P$ | 5 bars |
| $D_P$ | 40 L/s |
| $V_E$ | 2000 mm/s |
| $t_P$ | 80 ms |
| Tolerance over $t_M$ | ±10 ms s |
| Tolerance over $P_M$ | ±200 mbar |
| Measurement | |
| $t_M$ | 170 ms |
| $P_M$ | 3.2 bars |

In practice, the operations of storing the pressure curve in memory, identification of the local minimum M, comparison of the coordinates thereof to those of the theoretical local minimum $M_{th}$, as well as the feedback mentioned above on the parameters $P_P$, $D_P$, T and $V_E$ based on the results of this comparison, are handled by the control unit 19. More specifically, these operations result from the execution of instructions from a computer program implemented for that purpose in its processor 20.

The invention claimed is:

1. A method of manufacturing a container (2) by stretch-blow molding in a mold (8) from a blank (3) of plastic material, which comprises the operations of:
    heating the blank (3) to a predetermined heating temperature (T);
    inserting the blank (3) into the mold (8);
    stretching the blank (3) by a rod (10) moved at a predetermined stretching speed ($V_E$);
    at a predetermined instant, called pre-blowing cue ($t_P$), ordering the opening of a solenoid valve (17) to place an interior of the blank (3) in communication with a source (15) of gas at a predetermined pre-blowing pressure ($P_P$) and flow rate ($D_P$);
    measuring the pressure (P) prevailing inside the blank (3) as the pressure increases from an actual beginning of a preblowing operation until the pressure reaches a local pressure peak at a point (B), at an instant ($t_B$) and at a pressure ($P_B$), after which the pressure decreases;
    detecting, during the decreasing of the pressure after the point (B) corresponding to the local pressure peak, an instant ($t_M$), corresponding to a local minimum pressure (P) in the blank (3);
    placing in memory the instant ($t_M$) at which said minimum pressure is produced as well as the corresponding pressure ($P_M$) prevailing in the blank (3);
    comparing the instant ($t_M$) and the pressure ($P_M$) of the detected minimum with, respectively, a predetermined instant ($t_{Mth}$) and pressure ($P_{Mth}$) of a theoretical minimum pressure;
    if the measured minimum and the theoretical minimum do not coincide, ordering a modification of at least one of the following parameters: pre-blowing pressure ($P_P$), pre-blowing flow rate ($D_P$), stretching speed ($V_E$), heating temperature (T), so that the pressure ($P_B$) at the time of the local peak and the instant ($t_B$) at which occurs this local peak are substantially constant with respect to a pressure and an instant of a local peak measured during the earlier manufacturing of a container (2) or defined by theoretical values.

2. The method according to claim 1, comprising, if the instant ($t_M$) and the pressure ($P_M$) of the detected minimum are, respectively, prior to and lower than the instant and the pressure of the theoretical minimum, an operation comprising lowering the heating temperature (T) or the stretching speed ($V_E$).

3. The method according to claim 1, comprising, if the instant ($t_M$) and the pressure ($P_M$) of the detected minimum are, respectively,
    prior to and equal to the instant and pressure of the theoretical minimum, an operation comprising decreasing the pre-blowing pressure ($P_P$) or flow rate ($D_P$).

4. The method according to claim 3, comprising an additional operation comprising decreasing the heating temperature (T) or the stretching speed ($V_E$).

5. The method according to claim 1, comprising, if the instant ($T_M$) and the pressure ($P_M$) of the detected minimum are, respectively, prior to and higher than the instant and the pressure of the theoretical minimum, an operation comprising decreasing the pre-blowing pressure ($P_P$) or flow rate ($D_P$).

6. The method according to claim 1, comprising, if the instant ($t_M$) and the pressure ($P_M$) of the detected minimum are, respectively, equal to and higher than the instant and the pressure of the theoretical minimum, an operation comprising decreasing the pre-blowing pressure ($P_P$) or flow rate ($D_P$).

7. The method according to claim 6, comprising an additional operation comprising increasing the heating temperature (T) or the stretching speed ($V_E$).

8. The method according to claim 1, comprising, if the instant ($t_M$) and the pressure ($P_M$) of the detected minimum are, respectively, later and higher than the instant and the pressure of the theoretical minimum, an operation comprising increasing the heating temperature (T) or the stretching speed ($V_E$).

9. The method according to claim 1, comprising, if the instant ($t_M$) and the pressure ($P_M$) of the detected minimum are, respectively, later than and equal to the instant and pressure of the theoretical minimum, an operation comprising increasing the pre-blowing pressure ($P_P$) or flow rate ($D_P$).

10. The method according to claim 9, comprising an additional operation comprising increasing the heating temperature (T) or the stretching speed ($V_E$).

11. The method according to claim 1, comprising, if the instant ($t_M$) and the pressure ($P_M$) of the detected minimum are, respectively, later and lower than the instant and the pressure of the theoretical minimum, an operation comprising increasing the pre-blowing pressure ($P_P$) or flow rate ($D_P$).

12. The method according to claim 1, comprising, if the instant ($t_M$) and the pressure ($P_M$) of the detected minimum are, respectively, equal to and lower than the instant and the pressure of the theoretical minimum, an operation comprising increasing the pre-blowing pressure ($P_P$) or flow rate ($D_P$).

13. The method according to claim 12, comprising an additional operation comprising decreasing the heating temperature (T) or stretching speed ($V_E$).

14. A non-transitory computer-readable medium comprising a program to be implemented on a control unit of a machine (1) for manufacturing containers from blanks of plastic material, which comprises instructions for the implementation of the operations of the method according to claim 1.

15. The method according to claim 1, wherein the step of detecting the instant corresponding to the local minimum pressure in the blank occurs during pre-blowing of the blank and wherein, when the measured minimum and the theoretical minimum do not coincide, the ordered modification is carried out to cause the measured minimum and the theoretical minimum converge in the next cycle.

* * * * *